Sept. 13, 1949.　　　　　G. P. TOEWS　　　　　2,481,890
INTERNAL-COMBUSTION ENGINE AND
A METHOD OF OPERATING THE SAME
Filed May 19, 1945　　　　　　　　　　　2 Sheets-Sheet 2

Patented Sept. 13, 1949

2,481,890

UNITED STATES PATENT OFFICE 2,481,890

INTERNAL-COMBUSTION ENGINE AND METHOD OF OPERATING THE SAME

Gustav Peter Toews, Aldan, Pa., assignor to George B. Fowler, Springfield, Mass., as trustee Application May 19, 1945, Serial No. 594,673

15 Claims. (Cl. 123—191)

The present invention relates to an improved method of operating internal combustion engines employing igniters for firing a combustible charge within the cylinders of such engines, together with apparatus for carrying out the hereinafter claimed novel operating method.

This application is a continuation in part of application Serial No. 482,556, filed April 10, 1943, now abandoned.

The invention has for its primary purpose the insurance that the final combustion of the charge within the cylinders will not take place at or near the periphery of the piston, i. e., around the cylinder walls, and accordingly comprises a novel operating procedure of a novel ignition arrangement which insures the final combustion of the charge at a point remote from the confining walls of the combustion space, i. e., as an optimum condition at or near the center of the piston. It has been found that the present arrangement and/or firing order of igniters irrespective of the number employed and the manner of the firing thereof has not envisaged the reasons for present operating difficulties.

In the language of the art, one frequently speaks of the operating limit of an engine being that point at which the areas near the piston periphery begin to burn or deteriorate. The concentration of the final combustion which causes such burned areas also induces exceptionally heavy pressures at the precise points least able to withstand those pressures, i. e., between the piston periphery and the inner wall of the cylinder. This in turn causes the piston rings (the only barriers between the combustion space and the underside of the piston) to deteriorate rapidly with all the attendant shortcomings of such operation. The present inventor finds that no one has even hinted at the cause of such undesirable final burning at the periphery of the cylinder. By the same token it follows that, not knowing the reason for the undesirable condition, no one has, of course, been in a position to investigate in an endeavor to invent a remedy therefor. It is plain that an indiscriminate increase in the number of igniters does not provide the industry with a method of operation which will solve the difficulty.

However, the present inventor came to a knowledge of the reason for the undesirable peripheral burning when he observed the results of the accidental continued operation of an internal combustion engine while one of two normally operative igniters was disconnected. In a normal engine employing the simplest form of valve construction, i. e., one intake valve and one exhaust valve, it is usual to arrange the igniters on the axis between the two valves. In such a structure, i. e., an engine comprising an exhaust and an intake valve and two igniters arranged on the axis extending between the valves, the wave fronts initiated as the two igniters are fired tend to progress first towards the hottest area within the cylinder.

From the researches conducted by the present inventor, it appears to be definitely established that the combustion of a charge within the cylinder of an internal combustion engine takes place in such a manner that the propagation of the flame which is initiated by the electrical spark which passes across the sparking-points of the electrical igniter is oriented in such a manner that it will preferentially advance toward that point in the charge which is at the highest temperature. In a four-cycle engine this is in the vicinity of the exhaust valve or valves. The reason for this temperature gradient is to be found in the fact that the exhaust valves are at a much higher temperature than are the inlet valves. Inasmuch as the white-hot combustion products are pushed past the head and stem of the exhaust valves during the scavenging stroke of the piston, the exhaust valves and the other metallic parts of the engine in their immediate vicinity become heated to a temperature almost high enough in itself to ignite the combustible mixture in the cylinder. In fact, if the compression be sufficiently raised, undesired self-ignition of the charge has been known to have been effected.

Now, by reason of the conditions just mentioned, and in an engine constructed as has hitherto been the custom, and using, for example, one or two igniters, the direction of progress of the flame, or combustion front, has been first toward the area which has been more highly heated by the radiation from the highly heated exhaust valves, whereafter said combustion front is reflected back toward the cooler side of the cylinder, finally impinging upon the side thereof below the intake valves. As a certain amount of instantaneous combustion, or detonation, usually terminates the combustion phenomenon in the cylinder, this has caused a certain amount of blow-by at the side of the piston.

For many years it has been realized that engine operating limitations were imposed by the tendency of the inlet valve area to burn and the tendency of blow-by of the piston rings to occur at this point within the cylinder unless care was taken to run the engine within a variety of operating limits. Despite this continually encountered limitation, no one has ever discussed the reasons therefor as elsewhere herein set forth.

Accordingly, one feature of the hereinafter described invention resides in the location of an additional igniter at or near the center of the area which otherwise would be the locus of the final combustion and which would therefore be that area on the piston which would be most readily burned.

In a simple internal combustion engine of the type most frequently encountered, i. e., wherein the igniters are located on the axis between the inlet and exhaust valves, the invention comprehends the location of an added igniter near the inlet valve. The fact that the final combustion in internal combustion engines as now used takes place at or near the inlet valve with all the attendant shortcomings concomitant therewith has been explained. The simplest form of the invention accordingly involves placing an added igniter at this point, wherefrom to accomplish the removal of the final combustion area to a point remote from the periphery of the cylinder.

The time of firing the added igniter with respect to the time of firing of the normal igniters varies with the conditions in individual engines and is readily determined by the exploratory technique hereinafter set out. It has been found that in some engines the added igniter may be fired slightly in advance of the firing of the normally used igniters and that such location of igniter and order of firing the various igniters insures the final combustion taking place at the center. Accordingly, this last referred to example bears out the broad definition of the invention as the method of insuring the operation as indicated.

It has also been found that desirable results may be obtained when the added igniter is, or igniters are, fired either at the same time as the normally employed igniters or after the firing of the normally employed igniters. In short, the invention resides not in the order of firing the igniters after an igniter has been added to the system but rather in the appreciation that the final combustion at undesirable points is prevented by locating igniters, which are individually controllable as to time of firing, at or near those areas which otherwise would be objectionably burned. The invention may therefore be referred to as a system of controlled combustion within the combustion chamber to provide the results herein set forth.

Because the invention may be thus described, it is more than likely that one or more happenstance apparently similar systems may be discovered in the very widely developed internal combustion engine art. It will, however, be found that in all cases one of the factors necessary to enjoy the full measure of the presently described invention is missing. For instance, some engines in the past have used two exhaust and two intake valves and with igniters located over each of the valves. Such igniter location in this particular engine, however, as will hereinafter be more fully explained, does not insure the removal of the final combustion area to a point remote from the periphery of the piston even though it might cursorily appear that the arrangement responded to some of the appended claims. It will be seen that any such apparent response is always at best one of terms only and not of spirit, i. e., that the art obviously has not been taught the advantages of the present invention because even while the aviation industry was crying for longer range engines, no one came forward with the present suggestion.

The present invention enables the operation of internal combustion engines at a very great advantage as compared with prior practice. Not only is it possible to operate with less spark advance, but very much higher compression ratios can be used than had formerly been believed possible. This enables the use either of much lower octane-value motor fuel, or a great lowering in fuel consumption per brake horsepower output. Obviously, as when used in aircraft, this will vastly increase the operative range of the latter or, by decreasing the fuel requirements, will correspondingly increase the over-all carrying capacity.

Another outstanding advantage lies in the further fact that by use of the present invention, the effective ceiling of aircraft can be greatly increased. Thus with a certain type of liquid-cooled straight line engine having a supercharger giving a manifold pressure (M. P.) of 45 inches of Hg, the effective operating ceiling of the aircraft with maximum permissible power increase of 85% will be increased about 73%, as from 23,000 feet to about 39,000 feet. In case of radial-engined high-altitude bombers, for instance, a ceiling boost of 16,000 feet thus becomes possible with octane grade of fuel now used and without any more fuel being required.

Accordingly, as compared with wholly non-instructive and indiscriminate happenstance arrangements of any old plurality of igniters, the present invention includes the provision—in an internal combustion engine hereinafter indicated as operating on the usual four cycle principle (although this latter should not be taken as a limitation nor as suggesting that the invention will not be useful in other engines)—of an operating procedure whereby a plurality of flame fronts established within the combustion chamber are so directed and are finally so mergeable as to effect the ultimate or final consumption of the combustible constituents of the charge at a point sufficiently remote from the periphery of the piston, i. e., from the inner walls of the cylinder, that the hereinbefore encountered operation-limiting burning of the piston at its edges and the consequent blow-by will be avoided.

Therefore the invention, while not limited to valve-in-head type of engine, finds a great utility in connection therewith, and hence is hereafter more particularly described as associated with that type of engine. The invention is, however, fully applicable to all types of electrically ignited internal combustion engines, irrespective of the position of their cylinders. Thus the invention may be applied to straight-line, V, or radial types of engines. After coming to a knowledge of the herein explained invention, the location of the igniters in any particular engine and the connection thereof with the sources of electrical energy are matters which will be well within the skill of engine designers and producers. Hence the invention is described in broad terms in principle rather than in meticulous mechanical detail, and the drawings accompanying this specification are intended primarily to be diagrammatic and illustrative of the type of construction and operation contemplated, rather than to be working drawings showing every usual mechanical detail.

Again, the invention comprises a method and apparatus for practicing the same, making use of an ignition system for internal combustion engines, in which a plurality of separately firable electrical igniters (such as spark plugs) are employed, each of said igniters being provided with its own independent source of power so that the relative firing times of the separate igniters can be independently adjusted to meet the particular conditions existing in various engines and/or under varying conditions of operation in the same engine, all as indicated by exploratory techniques.

From another standpoint, it may be said that an object of the invention is the method, procedure and apparatus for carrying out the same, wherefrom the combustible charge within the combustion chamber of an engine cylinder is ignited not only as now usually provided but is also additionally ignited at a point nearer to the inlet valves than to the exhaust valves, thereby to develop coalescing waves or combustion fronts which will insure the final combustion in the cylinder at or near the center of the piston, i. e., in any event not at the internal periphery of the cylinder walls, said coalescing wave fronts being so initiated as to location and timing that the wave fronts will combine and coalesce to effect the operation as indicated.

In more particular, therefore, the present invention relates to a novel method of combustible charge ignition and spark plug arrangement for effecting the same, herein for convenience only being described as assoicated with spark-ignition engines having a valve-in-head type of construction. It is based upon the discovery that the conventional spark plug arrangement, as used in valve-in-head aircraft or automotive power plants today, causes final burning or detonating points to occur in a space near or at the side of the combustion chamber, and that these final combustion spaces or points can be shifted to a point at or near the center of the chamber by the use of deliberately added igniters (in its simplest form three instead of two points of ignition), providing these ignition points (spark plugs) are arranged as hereinafter more fully explained. Such an arrangement will be ideal from the standpoint of minimum ignition advance requirement for maximum power, least amount of piston blow-by, least amount of detonation, least amount of piston burning and other factors accompanying increased unit power output (B. M. E. P.) as effected by the use of a higher compression ratio or a higher supercharger boost pressure. The modification is therefore one upon which further improvement in B. M. E. P. output and economy of the valve-in-head spark-ignition engine depends, and without which maximum efficiency in either aircraft or automotive engines cannot be obtained.

The invention in part contemplates the provision of:

(a) An ignition system employing an arrangement and firing order of ignition points for spark-ignition engines (such, for example, those with valve-in-head construction) whereby final burning of the explosive mixture is caused to take place at about the center of the combustion chamber instead of at the side as now occurs in these same types of conventional engines.

(b) An ignition system employing an arrangement and firing order of spark plugs for valve-in-head spark-ignition engines whereby the ignition advance required for maximum power is far below that required with the conventional type of ignition arrangement as now used in aircraft and auto engines.

(c) An ignition system employing an igniter arrangement and firing order for valve-in-head spark-ignition engines in which detonation, when present, will be of minor importance and will take place at about the center of the combustion chamber instead of at the side.

(d) An ignition system employing an igniter arrangement and firing order for valve-in-head spark-ignition engines wherein the piston sealing rings will be as free as possible from the high pressure which accompanies final burning of the explosive mixture.

(e) An ignition system employing an igniter arrangement and firing order for valve-in-head spark-ignition engines which, with any presently available motor or aviation fuel, will permit of a 35 per cent boost in B. M. E. P. and a similar reduction in specific fuel consumption, as compared to that now obtained, and limited by detonation with the conventional type ignition arrangement as hitherto used in valve-in-head aircraft and automotive engines.

(f) An ignition system for a valve-in-head spark-ignition engine embodying a plurality of ignition points so located and fired as to prevent detonation from occurring at any point in the combustion chamber other than near the center.

(g) An ignition system employing an igniter arrangement and firing order of spark plugs for general use in spark-ignition engines wherein the maximum flame travel distance is thereby limited to permit of considerable boost in compression ratio before, due to arriving at the spontaneous ignition temperature of the fuel mixture, detonation is encountered.

(h) An ignition system employing an igniter arrangement and firing order as for valve-in-head spark-ignition engines which, with supercharging limited to one and one-half atmospheres absolute, as in aircraft at present, will allow the use of a 14:1 compression ratio with fuel of 100 octane, where, as compared to the 7:1 present limit, there will be 21 per cent less specific fuel consumption required for maximum power.

It should immediately be understood that merely employing more than two spark plugs and/or the indiscriminate placing and/or the firing of the same in some nondescript order does not even approach the solution of the problem which has herein been outlined. Many workers have heretofore attempted to increase the speed of combustion within the cylinder of internal combustion engines by providing a plurality of spark plugs or similar igniters. The very indiscriminate location of these plural plugs demonstrates that the prior workers in this art have not understood that combustion near or at the periphery of the piston is accompanied by the marked disadvantages which are herein elsewhere emphasized. See for instance the statements about the advantages of using more than the usual number of igniters in Woolson United States Patent No. 1,532,292. Or again an article on page 265 of Aerial Age for June 1923. The title of the latter was "Multiple spark plugs may mean more power." But the article concurrently proclaims that number or location of the plugs "makes little difference in the performance." Nor is a word said of the necessity for independent firability of the various plugs (igniters) or of adjustment as is required to effect final burning only at or near the center of combustion chamber. Finally, observe that two of the plugs are located directly over the exhaust valves so that no amount of happenstance location of plugs near the intake valve could eventuate inventor's results. As a matter of fact, this article misses the point entirely because its author did not initially know why the peripheral piston burning took place.

Therefore, it should be emphasized that final combustion close to the piston periphery with consequent burning of the latter around its periphery and the attendant material shortening of the piston life has always in the past been accepted as inevitable; it has made it necessary to take this factor into account and always to operate engines with reference to a time factor based upon the amount of safe operation before initiation of such burning. Not only is the piston ruined by such burning, but the blow-by is greatly accentuated because of the excessive pressure developed when final combustion is at the piston periphery, wherefrom it follows that the piston rings themselves are directly attacked by the pressure resulting from ultimate piston periphery combustion. Such blow-by diminishes the amount of power obtained from a given amount of fuel and causes crank case dilution or pollution, thereby aggravating and compounding the shortcomings of prior ignition systems.

It is agreed that the undesirable peripheral burning of the piston may be avoided if the engine is operated for relatively short times. Elsewhere herein a table indicates the marked advantages which are obtained by a realization that the peripheral burning can be avoided even though the engine is operated far beyond that point at which such burning would otherwise take place, this latter of course being accomplished only by utilizing the herein described procedures and apparatus.

In the accompanying drawings the invention is explained as embodying an ignition arrangement for spark ignition engines of the valve-in-head type of construction. This method of explanation has been adopted for sake of simplicity and is not intended to suggest that the utilization of the present invention is limited to such type of engine. It is thought that the simple valve-in-head engine amply illustrates the basic concepts of the invention and that those skilled in the art after having been advised of this concept will be able, without the exercise of invention and well within the hereinafter appended claims, to apply the principles of the invention to engines of other types. However, in this connection it should immediately be pointed out that many hereinbefore utilized engines of other types either do not present the problem of peripheral piston burning or that, because of the arrangement of the valve structure in said prior art engines, it is impossible to utilize the present invention or by the same token to find in such prior art engines any suggestion of the present invention.

Furthermore, it is thought desirable to explain the present invention by first pointing out the conditions existing in the hitherto known types of valve-in-head engines and then to describe the manner in which the presently disclosed methodic procedure and apparatus effects a cure of the undersirable heretofore encountered conditions with the consequent advantages herein listed and set out so far as proper in the appended claims.

Again, while the igniters in the hereinafter explained showings of the invention are located in the side of the cylinder wall, it will be understood that no change whatever either in the hereinbefore used ignition systems or in the system resulting from the application of the present invention arises from the placement of the igniters in the top of the cylinder instead of in the sides so long as the location of the igniters is at substantially the same points with respect to the combustion chamber.

The present inventor was able to make the hereindescribed invention only after fortuitously coming to a knowledge of the reason why detonation or final combustion (in an engine having one exhaust and one intake valve, the igniters being located on the axis extending between said valves) was taking place near the intake valve area close to the piston periphery. He found that the detonation or final burning occurring at or near the intake valve was influenced, if not in fact controlled, by spark plug location.

He had for a long time appreciated that, when two igniters are located on an axis extending across the cylinder between valves, the final burning occurred at or near the intake valve. After one excessively long run or test on the engine in question, examination of the piston disclosed a deteriorated or burned area in the vicinity of one of the igniters rather than near the inlet valve as was to be expected. Incidentally, the engine under test was of a type wherein detonation was ever present and wherein the piston had to be replaced frequently due to destruction by burning at or near the intake valve. In an endeavor to explain this singular circumstance, the inventor made a careful check of the apparatus, whereupon it was found that the igniter near which the piston deterioration had occurred had not been firing for some time by reason of the disconnection, at some time during the test, of one of the igniter lead wires.

After considerable study, the inventor came to the conclusion that the final combustion might have largely taken place at the area in question because of absence of ignition within that area. He accordingly then built a two-valve, two-igniter engine (wherein final combustion and consequent peripheral piston burning took place near the intake valve) but with an additional igniter deliberately located near said intake valve. He then fired this added igniter in several different timed relations with the normal igniters. Despite the running of this engine for excessive periods with low octane fuel, the normally expected piston periphery deterioration near the intake valve was not experienced. Rather, it was observed that the then affected area was positioned away from the periphery and towards the center of said piston. Thus it appeared that the studied and deliberate location and/or predetermined timed firing of an additional igniter in the area of normally-to-be-expected peripheral piston burning (or alternatively the normal area of final combustion) caused the removal of said area from the prejudicial vicinity.

This appreciation of the reason for such phenomena was a wholly new concept and lay at the foundation of the herein described invention.

Other objects and advantages of the invention will appear from a consideration of the following detailed specification.

Moreover, the recital of the foregoing objects or statements of invention is not intended to limit the inventive disclosure of the drawings and/or specification and/or claims. Accordingly, any and all novel features and/or combinations of features which are disclosed herein (the word "disclosed" being used as distinguished from "stated" or "claimed")—either in the drawings and/or in the specification and/or in the claim or claims (maybe in any one of the three sections of the application to the exclusion of the other two)—whether or not specified as new and/or comprising part of the invention and which were previously unknown, are the invention.

In short, everything herein is new unless it is herein specified and/or shall be found to have been known heretofore. Moreover, irrespective of whether or not all of the elements or combinations thereof, shown in the drawings or described in the specification or claimed in the claims, are asserted to be new, it is intended that the mere disclosure of these elements, and/or any combinations thereof, constitutes a claim of invention to every element and combination not known before.

Therefore, any and all combinations disclosed in any one or more of the three parts of this application may be claimed originally or at any future time. The necessity of claiming at some future time what is not now specifically designated as the invention may arise because others may claim what is herein disclosed but in language which is not now anticipated as definitive. Accordingly, future drafted claims may be required properly to protect the invention because it is not now possible to anticipate the variations of language which others may deem descriptive of some element or combination of elements herein disclosed.

Again, something fully disclosed herein may be unwarrantedly asserted not upon the filing hereof to have been stated to be part of the herein disclosed invention. Since, however, it is above pointed out that everything in the disclosure not heretofore known is part of the invention, right is reserved hereafter to assert claims to all material herein described.

Finally, even if an element, or combinations of elements, are herein described as performing only one purpose, the invention covers and provides for any and all other and/or additional purposes which any structure in the drawings or specification may hereafter be found to fulfill or be described as fulfilling. It is accordingly intended hereby to designate as the invention all purposes or uses thereof, and the right is reserved to add claims setting forth such purposes at any time prior to issue so long as the subject matter of such claims are disclosed upon filing.

The purpose of these reservations is to eliminate forthrightly any assumption—by anyone or by any tribunal or by any court hereafter speculating concerning what inventions may be disclosed in this application—that every element and/or combination of elements disclosed in this application is not intended to be asserted as the invention.

Accordingly, for a more complete understanding of the invention, reference is made to the accompanying drawings, in which Figures 1 and 1a are respectively top and partial side elevational views of a valve-in-head engine cylinder employing one exhaust and one intake valve and wherein the now known usually employed igniters are arranged on the axis located approximately midway between the exhaust and intake valves. In Fig. 1, as in all other similar figures, the top of the cylinder has been considered as transparent, thereby more clearly and simply to illustrate the invention.

The approximate development of the wave fronts initiated at the igniters is indicated by curved lines centered approximately at said igniters but trending more strongly to the hottest area within the cylinder combustion chamber, i. e., the vicinity of the exhaust valve. The shaded area at the left side of the piston top indicates that region or location where the final burning or combustion normally occurs with the undesirable hereinbefore explained concomitants.

Figs. 2 and 2a, which are positioned directly below Figs. 1 and 1a, are similarly top and partial side elevational sectional views of the same engine cylinder as shown in Figs. 1 and 1a but include an added igniter positioned and fired in accordance with the herein disclosed invention.

Figs. 3 and 3a are similar to Figs. 1 and 1a but illustrate an overhead valve engine cylinder having four valves wherein the two normally used igniters are positioned on an axis extending between one exhaust and one intake valve on each side thereof.

Figs. 4 and 4a illustrate the same engine as shown in Figs. 3 and 3a but with igniters added in accordance with the present invention to eventuate the advantages thereof.

Figs. 5 and 5a are similar to Figs. 3 and 3a, the engine ignition system again comprising two exhaust and two ignition valves but the normally-used igniters being located on an axis extending across the cylinder between two exhaust valves on one side and two ignition valves on the other.

Figs. 6 and 6a illustrate the same engine cylinder as shown in Figs. 5 and 5a with igniter added in accordance with the present invention.

Figs. 8 and 8a are of the same engine cylinder as in Figs. 7 and 7a but include an added igniter so positioned as to initiate a wave front at such point that the final combustion area will be moved as shown from the piston periphery towards the piston center.

Referring now more particularly to the drawings, Figs 1 to 8a, inclusive, illustrate in simplified form the upper or valved end of an internal combustion engine cylinder 20 having intake valves 21 and exhaust valves 22 positioned in the head of said cylinder, letters I and E being also placed on the valves to facilitate ready understanding of the location thereof. Igniters or spark plugs 23 and 24 may be properly termed the "normally used" or "presently employed" igniters in each of the illustrations, while the igniter or igniters which is or are added to carry out the novel method herein described and to comprehend the novel ignition system of the present invention are designated as 25. (Where more than one additional igniters are required, the same are designated as 25 and 25a.)

Pistons 26 are diagrammatically illustrated as movable within the cylinders 20 and piston rings 27 are shown in proper relation to the piston 26 and the interior wall of cylinder 20.

The area or region of final combustion or, as it is many times herein alternatively designated, the corrosion or burned area formed on the piston in both the now known systems and in those wherein the engines are operated in accordance with the novel procedures herein described are not indicated by number, since it is thought these areas are best illustrated merely by shading them in the various plan sectional views wherein the piston tops are shown. Furthermore, each of the top plan views includes conventional showings of propagated combustion wave fronts, each of these fronts initially being established at or emanating from the igniters positioned respectively at the focal points of the waves. Here, again, it is thought best not to complicate the showing by applying reference numerals to these wave fronts; they can be readily understood by inspection of the drawings when the latter are considered in connection with the discussion herein.

In each of the plan views a line drawn across the piston tops between the normally used plugs 23 and 24 is frequently referred to as the normally-used igniter axis, whereas the additional igniter or igniters positioned and fired in accordance with the present invention is or are positioned on another line axis drawn as indicated. These axes are drawn and are thus referred to for convenience only in describing the invention.

Figure 9:
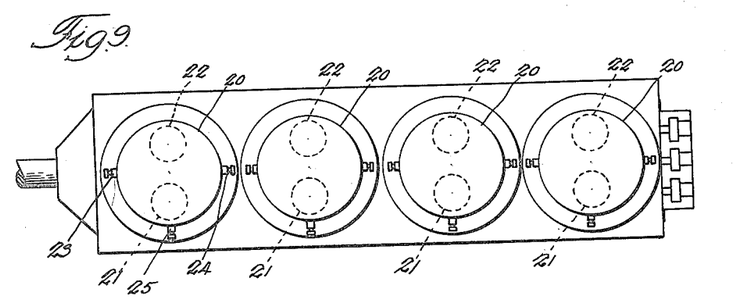
Figs. 9 and 10 are respectively a top plan view and a side elevational view (the latter partially sectioned), both views being mainly diagrammatical, of a four-cylinder, four-cycle valve-in-head type of internal combustion engine illustrating the application of the present invention. For the sake of simplicity, the magneto leads have been omitted from Fig. 9. It will be noted that each of the igniters i. e., both those usually found at present in an internal combustion engine and/or those added in accordance with the provisions of the present invention are separately and independently firable so that these may be fired in any order desired, i. e., the added igniter or igniters may be fired either before, after or at the same time as the normal igniters.
Figure 10:
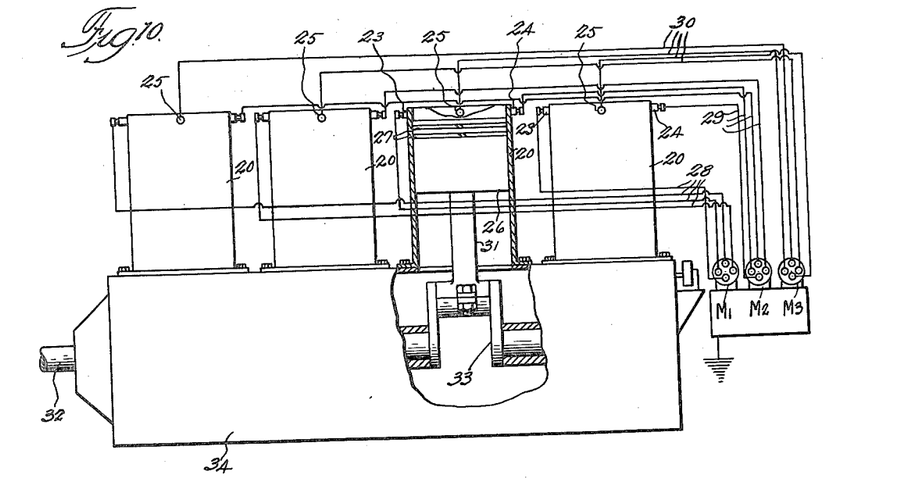

Before further discussing the invention as it relates to the location and firing of the igniters comprising the novel system, attention is directed to Figs. 9 and 10 which are respectively a top plan view and a side elevational partially-sectioned view, mainly diagrammatical, of a four-cylinder, four-cycle, valve-in-head type of internal combustion engine, these views being of importance as emphasizing the independent firing control which is available in connection with each of the igniters in each of the cylinders.

The spark plugs 23, 24 and 25 in each instance are connected to magnetos $M_1$, $M_2$, and $M_3$ by wires 28, 29 and 30, respectively, the magnetos being grounded on the negative side to the engine or frame supporting the same. In the plan view (Fig. 9) the wires have been omitted for sake of clarity.

One of the cylinders 20 is shown in section with the piston 26 in operative position therein. Connecting rod 31, crank shaft 32, crank 33 and crank case 34 are also included, it being, of course, realized that these elements are indicated to comprehend an operative disclosure and are of conventional construction and comprise a very diagrammatic illustration.

It will be understood that the source of power for driving the magnetos $M_1$, $M_2$, and $M_3$ can be derived from the motion of the shaft 33 by conventional means. Furthermore, it is not deemed necessary to include the mechanism whereby the magnetos $M_1$, $M_2$, and $M_3$ may be timed entirely independently of each other, all for the reasons as elsewhere herein emphasized. It is deemed a part of the disclosure as originally made that each magneto is, however, entirely independent so that the firing of each of the igniters one with respect to the other can be varied as determined by exploratory technique after the concept of the present invention has been applied to any particular engine.

Figures 1, 1A, 2, 2A, 3, 3A, 4, 4A, 5, 5A, 6, 6A, 8:
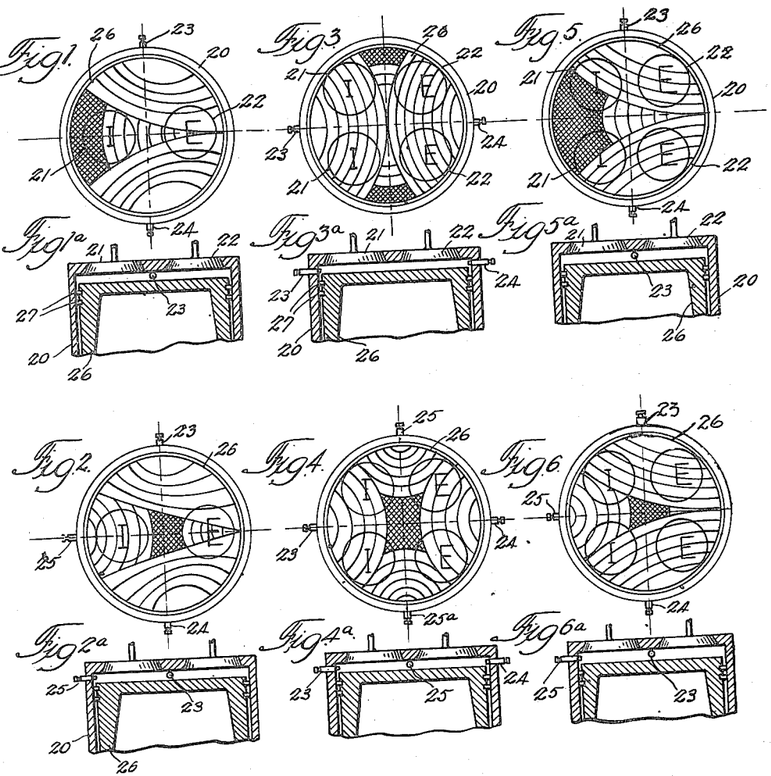

Referring now more particularly to the diagrammatic showings of the tops of the pistons in Figs. 1 to 8, inclusive, attention is first directed to Fig. 1 wherein the normal igniters are positioned on an axis located substantially midway between the intake and exhaust valves. Assuming that these igniters are fired together, the combustion wave fronts emanating therefrom develop substantially in the manner indicated by the wave front lines in this figure. Inasmuch as the hottest part of the combustion chamber is in the vicinity of the exhaust valve, the two combustion waves proceed very rapidly towards said hot region or area. Accordingly, the wave front contour lines are illustrated as trending more strongly toward said exhaust valve area. The waves then coalesce at or near the exhaust valve and/or are then jointly reflected from the interior wall of the cylinder in the vicinity of said exhaust valve in the direction shown towards the intake valve area. The shaded portion near the intake valve area in Fig. 1 illustrates that region in which the final burning, combustion and/or detonation of the charge takes place, all due to the unavoidable situation inherent in an internal combustion engine cylinder as illustrated, but the reasons for which have not prior to this disclosure been either appreciated or communicated to the workers in the internal combustion engine field.

It is understood that while a final combustion "area" is frequently referred to herein, this phenomenon in fact takes place in a three-dimensional space and this is sometimes recognized herein by referring to the final combustion or detonation "region."

It is because of the just referred-to shortcomings that engines of this character, particularly those which must be run at full speed as in the aviation field, are limited as to the time of operation to an unfortunate degree. If such limitations are not observed, the pistons rapidly corrode and deteriorate at the point indicated.

An equal if not more serious result of final combustion taking place at or near the piston periphery is the tendency to blow-by which is aggravated by such final combustion in this region. Fig. 1a demonstrates that the excessive pressure and temperature at the region of final combustion will cause an excessive pressure to be exerted in the piston rings at this point with consequent rapid deterioration of the latter. Even before such deterioration is noticeable, the blow-by at this point is excessive for the aforeindicated reasons. This results in crankcase pollution, loss of power and other inevitable concomitants of such occurrence.

The normal procedures which have attempted to eliminate the heretofore not-at-all or at best very imperfectly understood phenomena within the cylinder have included overly enriching the combustible charge fed to the cylinder. This was done with the hope that the spontaneous ignition temperature would thereby be sufficiently increased to prevent detonation from occurring before the normal flame travel through said charge (i. e., from igniters to the exhaust valve area and by reflection back to the intake valve area) has been completed. Such apparent cure for the peripheral or intake valve region burning and/or corrosion of the piston, however, introduces all of the undesirable concomitants of overrich charges and cannot therefore be said to have solved the problem.

Other workers in the art have suggested the use of higher octane fuels to counteract the aforesaid peripheral burning of the piston. It is true that if a sufficiently high octane fuel is used, one may to some extent prevent the undesirable peripheral piston burning. Although such fuels are difficult to obtain and involve some undesirable factors when used, they do eventuate greatly increased performance in connection with the present invention, i. e., novel engine adjustments can be made, for example, compression ratios, igniter location, valve material and construction, etc., can be improved.

However, when the concept of the present invention is employed, with a realization that the peripheral piston burning can be prevented by firing an igniter which has been deliberately placed within the region neighboring the otherwise normally burnable peripheral area of the piston, final combustion is compelled to take place not as shown in Fig. 1 but as shown in Fig. 2 (positioned for convenience directly below Figs. 1 and 1a). By locating the additional igniter 25 as shown and firing it as determined by exploratory techniques, the flame emanating therefrom can be made to meet that approaching from the region of exhaust valve E (after concentration and coalescence of the two combustion fronts from the igniters 23 and 24 near said valve by reason of the relatively higher temperature there existing) and the coalescence of the combustion fronts will occur substantially as indicated in Fig. 2, wherefrom the final combustion will take place near the center of the piston.

Not only does utilization of the procedures herein described result in such removal of the corrosion areas from the periphery of the piston, but as an additional result of utilizing the igniters positioned as indicated and fired in accordance with this invention, much less time is required to complete the burning of the entire explosive charge wherefrom the maximum-power ignition advance can be made much less.

It is thought desirable at this point to indicate that the coalescence occurs as indicated to eventuate final combustion near the center of the piston even though one or more of the igniters may be fired at degrees of advance which might confuse a cursory reader into the conclusion that the timing would cause said final combustion to occur at some other point. For instance, it must be remembered that the wave front from an igniter or igniters will travel much more slowly towards the exhaust valve area if the advance of these igniters is for instance 20° than when those igniters are fired at an advance of only 15°. This results from the fact that the wave front travels relatively slowly in a charge compressed to the lesser degree it would be when the piston is 20° below dead center and correspondingly travels much faster when the piston is, for instance, only 8° below dead center.

At this point also it should be pointed out that the showings here are diagrammatic because the inventive concept is in fact of such broad scope. Once the art is apprised of the invention, however, it will be possible to explore each engine in which it is desired to take advantage of this invention and determine by such exploration (engine tests, outlining of performance curves, interpolation, etc.) the proper timing of the igniters used. However, irrespective of the character of engine in which the present invention is to be used, the outstanding requirement is that the added igniters be so positioned that the otherwise existent area or region of peripheral burning or corrosion will be eliminated and the final combustion will be caused to take place centrally of the piston and cylinder.

In Figs. 3 and 3a two exhaust and two intake valves are used and the normal igniters are positioned as indicated on an axis so extending that one intake and one exhaust valve is on one side of said axis and one intake and one exhaust valve is on the other side of the axis. Under these conditions the wave fronts from the normally used igniters would coalesce to cause the final combustion to take place in the two shaded areas (it being assumed that the advance of the intake igniter is slightly more than that of the exhaust igniter). Accordingly, when two intake and two exhaust valves are sometimes used, it will be apparent that the problem of peripheral piston corrosion and blow-by at these points is greatly aggravated. When two intake and two exhaust valves are used and two normal igniters are located as shown, the piston will be corroded in two areas and the rings will probably distort to permit blow-by at the two points as indicated.

Here again, however, by invoking the herein described inventive concept, and placing igniters 25 and 25a at the points indicated, additional wave fronts will be propagated, as indicated by the wave front lines, to cause final combustion to occur substantially centrally of the piston.

Thus Fig. 3 illustrates that the location of one plug opposite another does not eliminate undesirable peripheral burning. In an engine with but a single normal plug (assume that plug 24 is such a plug) the flame propagation will cause final burning at the opposite side of the piston. However, location of one other plug, assume for the moment that plug 24 is an "added" plug, in this area will not confine the final burning centrally of the piston. In short, the use of two plugs sets up two peripheral burning areas (see shaded areas in Fig. 3); therefore in order to eliminate all areas of peripheral burning it will be necessary to locate the requisite number of added plugs in these potential areas of undesirable burning.

Figs. 5 and 5a illustrate a valve system similar to that shown in Figs. 3 and 3a but wherein the normal igniters 23 and 24 are positioned on an axis which so extends that the two intake valves are on one side thereof and the two exhaust valves are on the other side thereof. When these igniters are fired, peripheral piston burning, by reason of the final combustion occurring at the shaded area, will once again be encountered. This latter will, however, be alleviated by the placement of an additional igniter 25 as shown in Figs. 6 and 6a, and firing the latter in timed relation as dictated by exploratory technique to insure the final combustion centrally of the piston.

Figure 7:
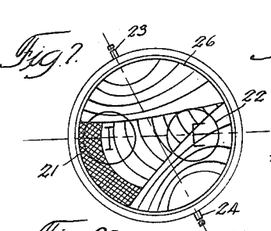
Figs. 7 and 7a are views similar in character to those in the preceding numbered figures but wherein the normally used valves are positioned on an axis which has been angularly shifted as compared to that shown in Fig. 1 with a resultant normally occurring peripheral piston deterioration being located as indicated.
Figure 7A:
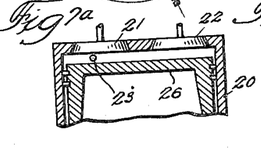

Finally, it is thought desirable to indicate one unusual condition in Figs. 7 and 7a. One American manufacturer of aircraft engines of recent design has shifted the normal igniter axis from the position shown in Fig. 1 to that shown in Fig.

7. By so doing, the peripheral piston burning is aggravated and will occur substantially as indicated in Fig. 7. This condition can nevertheless be relieved as similar conditions were remedied in other engines. The added igniter 25 shown in Fig. 8 initiates such a combustion wave front that the area of final combustion takes place centrally of the piston and cylinder as shown in said figure.

As early herein indicated, the various igniters have all been shown as positioned in the side of the cylinder wall and with their ignition points being operative within the portion of the cylinder usually referred to as the combustion chamber of the cylinder. This location, of course, differs in various engines and is dependent upon the points from which it is desired that the combustion fronts shall emanate. However, it is within the spirit of the present invention to position all of the igniters (which have hereinbefore been described) in the top of the cylinder if such arrangement is desired. Furthermore, in each of the side elevational views the pistons are shown at their point of maximum travel towards the cylinder head or what is known as dead center when the piston travel is oriented with respect to the top point on the shaft of the engine.

It has been hereinbefore indicated that the additional igniters may be fired either before, at the same time, or after the normal igniters are fired. This flexibility is expressed in the claims by referring to a plurality of independently firable igniters, i. e., the igniters are specified as being independently controlled as to the time of firing. From another approach, it may be said that each of the igniters is provided with a separate controllable source of electric energy. Of course, these two factors may be combined, i. e., each of the igniters is provided with a separate source of controllable electrical energy and each of said igniters is also separately controlled as to its timing. It will be observed from a study of the foregoing description, taken in connection with the drawings, that each of the igniters is associated with a separate timing mechanism.

The immediately foregoing being true, what have been referred to as the normal igniters can be fired either simultaneously or in spaced relation, while the added igniter or igniters—positioned and fired in accordance with the present conception and for purposes not known before this description—can be fired in that optimum timed relation to said normal igniter firing which exploration shall predetermine. Thus the optimum advance for each of the various igniters is secured.

As indicative of the manner in which this relationship as to time of firing may change, reference is made to some of the tests which the present inventor has carried out. After determining the reason for peripheral piston deterioration as hereinbefore set forth and after having determined that controlled combustion should be utilized to insure final combustion of the explosive charge in an area removed from the periphery of the piston, an elaborate series of engine tests was made. As a result thereof it was thought that an advance of 20° on the normal igniters and an advance of 8° on the added igniter would eventuate the best results.

Later, however, due to the constant testing, particularly when it was desired to get the figures for normal running to demonstrate the accretion occasioned by the peripheral piston burning, it was found desirable at times to replace accreted or affected valves. A valve of more expensive construction and material than is usually provided in such an engine was then used on the assumption that such a valve would not accrete as easily. While this valve was being used, it was found that the timing could be further reduced, i. e., that both the normal and the added igniters could be fired at an advance in the neighborhood of 15°. However, further tests indicated that the accretion was always more or less present when the ordinary high octane fuel was used. Inasmuch as high octane had always necessarily been heretofore used, the affected valve was subject to the influence of the ethyl constituents in such fuel. Because it would have been impractical to use unethylized fuel, the effect of the ethyl constituents on the valve stem was not appreciated. With the present invention, however, the valve is not accreted or affected because it is not necessary to use the high octane or ethylized fuel in the operation of the engine. By the use of such suitable lower octane fuel, the indicated valve is not affected and corresponding advantages ensue, all because of the revelations herein set forth. In any event, the timing can be even further reduced with even more desirable results as indicated in the hereinafter referred-to data secured during the inventor's tests, and this irrespective of whether or not a special accretion-resisting valve is used.

It has also been determined that, under other conditions too elaborate to be explained herein, the added igniter may be fired before the normal igniters are fired to obtain desired results. While the inventor has checked the advantages resultant from the present invention by an extensive series of tests, it is not deemed necessary to do more than indicate herein the advantages secured by the use of this invention.

For instance, it is not thought necessary to include herein all of the recorded engineering test data (and curves derived therefrom) in support of the contentions made herein. However, it is believed proper to set forth briefly the approximate percentage advantages resulting from the incorporation of the novel herein described ignition procedure and mechanism in an engine wherein the cylinders are charged through one intake valve and discharged through one exhaust valve and wherein the normal igniters are situated on an axis extending substantially midway between the two valves, the igniter added in accordance with the invention being located near the intake valve. The engine used was found to exhibit best performance at a 28° advance simultaneous firing of the two normal igniters. Accordingly, the hereinafter-referred-to percentage increases are figured with the normal optimum performance at 28° advance as a basis. Moreover, the fuel used in establishing said basis was 69 octane as determined from full throttle tests made with three grades of fuel, i. e., 80, 62 and 46 octane.

From the standpoint of octane fuel advantage, it was found that the same optimum results were obtainable with 46 octane fuel when the added igniter was used, the normal igniters being fired at 20° advance and the added igniter at 8° advance. Thus the advantage on this basis is that a 33% lower octane fuel is required. Moreover, as hereinbefore set out, the normal igniters can be fired at a 15° advance and the added igniter also fired at a 15° advance under which conditions a 37 octane fuel gave the same results as previously obtained under the circumstances indicated with the 46 and 69 octane fuel. Thus the percentage gain obtained by using the invention (both normal and added igniters being fired at 15° advance), as compared to the system wherein the added igniter is not used, is equivalent to 46% lower octane being required. The most cursory consideration of these just-referred-to octane figures emphasizes the marked advantage in engine operation derivable from the uses of the herein claimed invention. It is not necessary to elaborate on the many advantages which arise from the ability to use a fuel having an octane number substantally half of that heretofore necessary to obtain desired results.

Coming now to the question of spark advance, it was found that when the added igniter was used (the normal igniters being fired at 20° advance and the added igniter at 8° advance), the reduction in spark advance was 29% whereas when both the normal and added igniters were fired at substantially 15° advance, the reduction was of the order of 46%.

From the standpoint of fuel consumption, i. e., pounds of fuel per brake horsepower hour, the improvement at 20° and 8° advance firing of the normal and added igniters respectively in the novel system was 59%; whereas when all the igniters were fired at about 15° advance improvement on this score was 69%.

With all other conditions remaining the same, a horsepower increase of 50% was obtained at 20° and 8° advance firing and 85% at 15° and 15° advance firing.

The foregoing is epitomized in the following table, wherein the "Fuel octane," "Per cent reduction in fuel consumption," "Per cent increase in maximum horsepower," and "Per cent increase in altitude" are maximum obtainable advantages and therefore apply separately; if considered together these values must be proportionately reduced. Moreover, the percentage values in the right-hand (last) column refer to percentage increases in altitude density (relative to present density) at which rated power is obtainable.

quently grievously limited time. This limitation arises from the potential destruction of the piston because of excessive localized pressures and temperatures which occur at the periphery as a form of detonation. With the system herein described, it is possible to operate continuously far beyond the present time limitations and without encountering the adverse effects to engine parts or in efficiency which have hereinbefore been described.

One outstanding advantage resulting from the use of the hereinbefore described invention is the definite shortening of the period of combustion. Since accurately positioned wave fronts are propagated towards one another, the period of combustion is substantially shortened. This in itself is a vital factor in reducing the limitations within which the engine must operate and eventuates the various percentage advantages which are elsewhere herein set out. In other words, the time required for complete combustion of the charge is shortened when the novel technique herein described is employed. When only the now known and usual igniters are present, the timing of said normal igniters must be so greatly advanced to insure complete combustion that in one engine with which the inventor is familiar an advance of about 28° is used to insure total combustion before the piston reaches the top of its travel. However, when the present invention is employed, the timing and positioning of the plugs can be so adjusted that total combustion may be secured at an advance of substantially 15°.

As the advantages resident in the present invention are considered, it must be remembered that it is substantially impossible to compare the temperatures at the intake valve area when a sufficiently high octane fuel is employed with those when a lower octane fuel is employed. For instance, if 80 octane fuel is employed, there is not a significant difference in engine operation, other things being equal.

However, one of the outstanding advantages associated with using the present invention is the ability to make a much lower octane fuel operate any engine with the same efficiency and

*Percentage comparison of results of operating two cylinder valve-in-head engine in accordance with invention*

| Degrees Spark Advance | | Octane No. of Fuel | | Per Cent Reduction In Maximum Spark Advance | Per Cent Reduction In Fuel Consumption | Per Cent Increase in Maximum Horsepower | Per Cent Increase in Altitude |
|---|---|---|---|---|---|---|---|
| Of Normal Igniters | Of Added Igniter | Oct. No. | Per Cent Reduction | | | | |
| 28 | Not Fired | 69 | 0 | 0 | 0 | 0 | 0 |
| 20 | 8 | 46 | 33 | 29 | 59 | 50 | 33 |
| 15 | 15 | 37 | 46 | 46 | 69 | 85 | 46 |
| 14 | 16 | | | Approximately same as above 15°-15° values | | | |

The fact that the final burning or combustion area can be removed from near the periphery of the piston by use of the present invention insures that an engine embodying this invention can be operated at full speed, without burning the piston, for several times longer than similar engines can now be run, particularly when these engines are used in aviation where a five minute burst of speed has frequently been indicated as the time limit for full speed operation. It will probably not be disputed that no present aircraft engine of the type herein described is capable of operating at maximum power continuously for more than a relatively and frequently absence of burning combustion chamber parts and pistons as is possible when using a higher octane fuel. For instance, when 46 octane fuel is employed with the ignition techniques herein described, the engine can be run at the same efficiency as though the higher octane fuel were employed. However, it stands to reason that one cannot ascertain the comparative effect between using 46 octane fuel in the normal ignition system and that possible when using 46 octane fuel with the present invention. In short, if 46 octane fuel is used with the normal ignition system, the peripheral final combustion or detonation area would so speedily burn out the piston and the cylinder side near the intake valve that a fair approximation of what could be expected with 46 octane fuel in engines employing the presently known ignition system cannot be secured. However, when 46 octane fuel is used in engines embodying the present novel ignition system, the burning of the piston near its periphery and of the cylinder walls will never occur.

Another benefit resulting from the use of the instant invention is the greatly increased engine life which results therefrom. The engine life should be at least doubled and this in turn will so extend the time intervals between necessary overhauls that the resultant effect of such increased life is markedly felicitous.

Again, when the area of final combustion is remote from the piston periphery, i. e., at or near the center of the piston, heat transfer and cooling can be effected in a markedly more efficient manner than is now possible. In short, although the final combustion takes place near the center of the piston relatively no deterioration or burning occurs when the present invention is used. This follows because when operating in accordance with the present invention the material in the piston can be so arranged that a greatly improved transfer of the heat resulting from said final combustion is possible. In short, when the final combustion and incipient burning are at the piston edge, it is impossible to withdraw the heat with the same facility as when the final combustion takes place at the center of the piston.

From the foregoing, the invention may be epitomized in many ways, but one of the most facile methods of so doing is to make the following statement, i. e., the added igniter or igniters should be located within that region which, when any of the now normally employed ignition systems are used, is the region of final combustion and consequent present objectionable piston burning. The location of the added igniters in the latter area eventuates such a wave front or fronts that the coalescence of the latter with the wave front or fronts initiated by the normally used igniters (both the normal and added wave front propagating igniters being so timed as suggested by the exploratory technique that the combustion is controlled in predetermined manner) insures final combustion remote from the piston periphery. This has been herein denoted as "controlled combustion" which within the definition thereof as implicit herein has to the knowledge of the present inventor not been heretofore practiced nor have the advantageous concomitants thereof been sufficiently appreciated even to cause the problem involved therein to be posed.

At times hereinbefore the use of independent energy sources and independent timing by independent magnetos has been described. It should, however, be understood that such independence of the various indicated factors may be considered to be most necessary in connection with the exploratory technique, wherefrom it is determined whether the properly located added igniter in any particular engine is to be fired before, at the same time or after the firing of the igniters normally employed in such engine and need not necessarily continuously be available thereafter. Again, it is, however, entirely possible that the same end may be achieved through the use of novel igniter energy supplies wherewith the possibility of independent timing can be insured without having independent magnetos. For instance, independent ignition and timing may possibly be derived from a single source of energy.

Accordingly, the explanation, wherein the independence of the energy sources and of the magnetos and of the timing of the igniter firing have been described, is to be understood as defining the manner of operating the present invention rather than imposing any restrictions upon the apparatus which is to be used. In short, if apparatus is hereafter developed whereby this invention can be practiced without the necessity of the various hereinbefore described independent factors, such practice of the invention will be within the scope of this disclosure.

Again, after coming to a knowledge of the instant invention and after following the prescribed exploratory analysis of a given engine type and construction, the various magneto settings can be left fixed and the defined independence of timing, energy sources, etc., not again invoked until engine conditions change (this procedure is covered both in some of the hereto attached method and apparatus claims). However, the appreciation of the independence of the hereinbefore described factors should be had in connection with determining the "when, where and how" of the added igniters. In other words, it is intended that the operation of an internal combustion engine having igniters located as hereinbefore specified and fired either before, at the same time, or after the normal igniters are fired is within the scope of the appended claims and this even though the magneto settings are not maintained independent and/or even though the various instrumentalities have been so arranged in accordance with this invention that independent sources of energy and independent timing are not necessary in order to ejoy the advantages thereof. The latter is true, however, only when the fixed settings of the various energy supply sources and magneto timing devices have been so determined that the advantages of the herein described invention may be realized.

Expressed otherwise, while independent facilities are used to ascertain the optimum factors whereby the invention may be practiced, i. e., in valve construction, compression ratio, timing and igniter location, such independence is not necessary after said determination has once been made.

Above and beyond all else it should be realized that the location of the added igniters lies at the foundation of the present invention and that this in itself is a matter which is not involved in the independence of the various hereinbefore referred-to factors.

Therefore it is not intended that the description heretofore given of the invention and/or the showing thereof set forth in the drawings is limiting in any respect of the monopoly claimed. It is on the contrary intended that all claims hereinafter allowed, whether made initially or to be added (assuming that they are properly supportable by the drawings and/or specification and/or claims originally made herein), shall be the measure of the scope of the invention herein set forth. Accordingly, and with the foregoing in mind, what is claimed as new and is desired to be secured by Letters Patent is (remembering that claims broader than those now included may hereafter be found properly includible herein):

1. The method of controlling combustion in an internal combustion engine embodying a piston movable within a cylinder in response to the ignition of a combustible charge above said piston which comprises establishing at least three ignition points in said charge and locating at least one of said points in each area which might be adversely affected by the final combustion and selectively timing the firing of said thus established ignition points with consequent insurance that all final combustion areas are removed from the periphery of said piston.

2. The method of controlling combustion in an internal combustion engine embodying a piston movable within a cylinder in response to the ignition of a combustible charge above said piston which comprises establishing at least three ignition points in said charge and locating at least one of said points in each piston peripheral area which might be adversely affected by the final combustion and selectively timing the firing of said thus established ignition points to ignite the charge at said potential piston periphery final burning areas before the ignition of the remainder of the charge with consequent insurance that all final combustion areas are removed from the periphery of said piston.

3. The method of controlling combustion in an internal combustion engine embodying a piston movable within a cylinder in response to the ignition of a combustible charge above said piston which comprises establishing at least three ignition points in said charge and locating at least one of said points in each piston peripheral area which might be adversely affected by the final combustion and selectively timing the firing of said thus established ignition points to ignite the charge at said potential piston periphery final burning areas at the same time that the ignition of the remainder of the charge is ignited with consequent insurance that all final combustion areas are removed from the periphery of said piston.

4. The method of controlling combustion in an internal combustion engine embodying a piston movable within a cylinder in response to the ignition of a combustible charge above said piston which comprises establishing at least three ignition points in said charge and locating at least one of said points in each piston peripheral area which might be adversely affected by the final combustion and selectively timing the firing of said thus established ignition points to ignite the charge at said potential piston periphery final burning areas after the ignition of the remainder of the charge with consequent insurance that all final combustion areas are removed from the periphery of said piston.

5. In an internal combustion engine of the electrically fired type including a cylinder having a piston therein, the improvement which comprises at least three igniters for each cylinder, two of said igniters being positioned intermediate the valves of the cylinder of the engine, and at least one of the others near the inlet valve, means for firing said igniters, and means for so timing said firing means that all final combustion areas are removed from the periphery of said piston.

6. In an internal combustion engine of the electrically fired type including a cylinder having a piston therein, the improvement which comprises at least three igniters for each cylinder, two of said igniters being positioned intermediate the inlet and exhaust valves of the cylinder of the engine, and at least one of the others near the inlet valve, means for firing said igniters, and means for so timing said firing means that all final combustion areas are removed from the periphery of said piston.

7. In an internal combustion engine of the electrically fired type including a cylinder having a piston therein, the improvement which comprises at least three igniters for each cylinder, two of said igniters being positioned intermediate the inlet and exhaust valve areas of the cylinder of the engine, and at least one of the others near the inlet valve area, means for firing said igniters, and separately controllable means for so timing said firing means that all final combustion areas are removed from the periphery of said piston.

8. In an internal combustion engine the combination of a piston, a cylinder, intake and exhaust valves in said cylinder, and at least three igniters in each cylinder, two of the latter being positioned along a line intersecting a line drawn through the inlet and exhaust valves, and a third igniter located in a line which is at an angle to said first mentioned line and nearer to the inlet valve than to the exhaust valve, means for firing said igniters, and independent means for so timing the operation of at least said third igniter that all final combustion areas are removed from the periphery of said piston.

9. In an internal combustion engine the improvement which comprises providing each cylinder thereof with at least three spark plugs, two of said spark plugs being located on the opposite ends of a diameter of the cylinder, and a third spark plug being located on a line which is substantially at right angles to said diameter and near the inlet valve of the cylinder, a piston being located in said cylinder, means for firing each of the plugs and means for selectively timing the firing of at least the third plug to insure that all final combustion areas are removed from the periphery of the piston.

10. In an internal combustion engine the combination in a cylinder thereof of at least three spark plugs, two of them being located at the opposite ends of a line drawn transversely through the cylinder and intersecting a line drawn through the inlet and outlet valves thereof, and a third spark plug located near the inlet valves of said cylinder and spaced equidistantly from the two first mentioned spark plugs, a piston located in said cylinder, means for simultaneously firing the two opposed spark plugs, and means for selectively firing and timing at least the third spark plug to insure that all final combustion areas are removed from the periphery of said piston.

11. Method of operating an internal combustion engine which comprises compressing a charge of combustible gases in a cylinder thereof and firing said charge from a spark plug located near the inlet valve thereof to create an advancing flame front and almost immediately thereafter further igniting the charge by means of two oppositely arranged spark plugs to create two advancing flame fronts, whereby the resulting three flame fronts will effectively locate the area of ultimate combustion in the cylinder away from the periphery thereof.

12. Method of operating an internal combustion engine which comprises compressing a charge of combustible gases in a cylinder thereof and firing the charge therein from three separate points, two of them being opposed to each other so as to create two advancing flame fronts, and a third, fired slightly in advance of the other two, producing a third flame front from a point which is on a line extending substantially at a right angle to a line connecting said opposedly located spark plugs, whereby the resulting three flame fronts will confine the ultimate combustion in the cylinder to substantially the centrally located area thereof.

13. In an internal combustion engine including a cylinder and a piston movable therein, means for supplying a combustible charge over said piston, igniter means for inducing and propagating two or more merging flame wave fronts in said charge and transversely of the piston, said merging wave fronts coalescing to form one or more potential peripheral final burning areas, means for initiating and propagating in a plane at substantially right angles to the axis of the piston additional flame wave fronts corresponding in number to the potential peripheral final burning area coalescences, said additional flame wave fronts being propagated from such locations and in such directions and being so timed that they are oppositely effective to the resultant coalescences of the first named waves thereby to insure that all final combustion areas in said charge over said piston are removed from the piston periphery.

14. The method of operating an internal combustion engine including a cylinder, a piston movable therein and means for supplying a combustible charge over said piston which comprises inducing and propagating—transversely of said piston—two or more merging wave fronts in said charge, said wave fronts coalescing to form one or more potential peripheral final burning areas, initiating and propagating in a plane at substantially right angles to the axis of the piston additional wave fronts corresponding in number to the potential peripheral final burning areas, said additional wave fronts being propagated at such locations and in such directions and being so timed that they are oppositely effective to the resultant coalescences of the first named waves thereby to insure that all final combustion areas in said charge over said piston are removed from the piston periphery.

15. The method of operating an internal combustion engine of the electrically fired type having a cylinder provided with exhaust and intake valves wherein normal ignition points are located on a diameter angularly disposed with respect to a diameter extending equidistant between the exhaust and intake valves which comprises establishing an ignition point located near the intake valve and on a line substantially perpendicular to and intersecting the line extending through the normal ignition points and intersecting said last named line at substantially the midpoint thereof, and selectively propagating a wave front—in a plane at substantially right angles to the axis of said cylinder—from said last referred to ignition point to coalesce with the wave fronts emanating from said first defined ignition points and also in said plane at right angles to the axis of said cylinder to cause final combustion to occur in an area substantially central of the engine cylinder.

GUSTAV PETER TOEWS.

REFERENCES CITED

The following references are of record in the file of this patent:

UNITED STATES PATENTS

| Number | Name | Date |
| --- | --- | --- |
| 1,008,059 | Phillips | Nov. 7, 1911 |
| 1,342,553 | Leinweber | June 8, 1920 |
| 1,352,945 | Fay | Sept. 14, 1920 |
| 1,375,256 | Maire | Apr. 19, 1921 |
| 1,532,292 | Woolson | Apr. 7, 1925 |
| 1,599,354 | Arnold | Sept. 7, 1926 |
| 1,847,612 | Horning | Mar. 1, 1932 |
| 1,913,310 | Moore | June 6, 1933 |
| 2,028,434 | Bernard | Jan. 21, 1936 |
| 2,285,107 | Bohli | June 2, 1942 |